United States Patent
Li et al.

(10) Patent No.: US 10,735,971 B2
(45) Date of Patent: Aug. 4, 2020

(54) COMMUNICATION METHOD AND COMMUNICATION DEVICE

(71) Applicant: YULONG COMPUTER TELECOMMUNICATION SCIENTIFIC (SHENZHEN) CO., LTD., Shenzhen (CN)

(72) Inventors: Ming-Ju Li, Shenzhen (CN); Ya-Jun Zhu, Shenzhen (CN); Yun-Fei Zhang, Shenzhen (CN)

(73) Assignee: YULONG COMPUTER TELECOMMUNICATIONS SCIENTIFIC (SHENZHEN) CO., LTD., Shenzhen (CN)

( * ) Notice: Subject to any disclaimer, the term of this patent is extended or adjusted under 35 U.S.C. 154(b) by 24 days.

(21) Appl. No.: 16/331,610

(22) PCT Filed: Dec. 28, 2016

(86) PCT No.: PCT/CN2016/112784
§ 371 (c)(1),
(2) Date: Mar. 8, 2019

(87) PCT Pub. No.: WO2018/045681
PCT Pub. Date: Mar. 15, 2018

(65) Prior Publication Data
US 2019/0215699 A1    Jul. 11, 2019

(30) Foreign Application Priority Data

Sep. 9, 2016    (CN) .......................... 2016 1 0818897

(51) Int. Cl.
H04W 4/00    (2018.01)
H04W 16/14    (2009.01)
(Continued)

(52) U.S. Cl.
CPC ............. *H04W 16/14* (2013.01); *H04L 5/001* (2013.01); *H04W 16/18* (2013.01); *H04W 48/10* (2013.01);
(Continued)

(58) Field of Classification Search
CPC ..... H04W 16/14; H04W 16/18; H04W 76/15; H04W 48/10; H04W 56/001;
(Continued)

(56) References Cited

U.S. PATENT DOCUMENTS

2015/0163825 A1* 6/2015 Sadek ............... H04W 74/0808
370/329
2015/0296486 A1* 10/2015 Park ...................... H04W 48/00
370/329

(Continued)

FOREIGN PATENT DOCUMENTS

CN    105050189 A    11/2015
CN    105848292 A    8/2016
(Continued)

*Primary Examiner* — Thai D Hoang
(74) *Attorney, Agent, or Firm* — ScienBiziP, P.C.

(57) ABSTRACT

The present disclosure provides a communication method and a communication device. The method includes: configuring at least one serving cell for each terminal, each of the at least one serving cell working on an unlicensed carrier; selecting at least one of the at least one serving cell as a primary cell or a primary secondary cell of the terminal, the selected serving cell forming a primary cell group or a primary secondary cell group of the terminal; and controlling the primary cell group or the primary secondary cell group to send a MIB to the terminal. The technical solution improves a transmission probability of the MIB of the primary cell group or the primary secondary cell group on an unlicensed frequency band, ensuring that a user receives the MIB in time to perform a time synchronization, the com- (Continued)

munication is normal, and delay and efficiency requirements of communication are met.

20 Claims, 6 Drawing Sheets

(51) Int. Cl.
    *H04L 5/00*     (2006.01)
    *H04W 48/10*     (2009.01)
    *H04W 76/15*     (2018.01)
    *H04W 16/18*     (2009.01)
    *H04W 56/00*     (2009.01)
    *H04W 72/04*     (2009.01)
    *H04W 74/08*     (2009.01)

(52) U.S. Cl.
    CPC ..... *H04W 56/001* (2013.01); *H04W 72/0446* (2013.01); *H04W 72/0453* (2013.01); *H04W 74/0808* (2013.01); *H04W 76/15* (2018.02)

(58) Field of Classification Search
    CPC ......... H04W 72/0446; H04W 72/0453; H04W 74/0808; H04L 5/001
    USPC ................................ 370/329, 330, 335–348
    See application file for complete search history.

(56) References Cited

U.S. PATENT DOCUMENTS

| | | | | |
|---|---|---|---|---|
| 2015/0296508 | A1* | 10/2015 | Fan | H04W 72/1273 370/329 |
| 2015/0311923 | A1* | 10/2015 | Valliappan | H04W 16/14 370/338 |
| 2015/0373582 | A1* | 12/2015 | Valliappan | H04W 72/082 370/329 |
| 2016/0044667 | A1* | 2/2016 | Chen | H04W 72/0446 370/329 |
| 2016/0088625 | A1* | 3/2016 | Kadous | H04L 27/0006 370/329 |
| 2016/0095134 | A1* | 3/2016 | Chen | H04L 1/1822 370/336 |
| 2016/0100433 | A1* | 4/2016 | Vajapeyam | H04L 5/00 370/329 |
| 2016/0135172 | A1* | 5/2016 | Sun | H04W 74/006 370/329 |
| 2016/0174215 | A1* | 6/2016 | Zhang | H04W 72/14 370/329 |
| 2016/0182134 | A1* | 6/2016 | Kol | H04J 11/0023 370/329 |
| 2017/0237539 | A1* | 8/2017 | Xu | H04W 72/0446 370/329 |
| 2017/0238343 | A1* | 8/2017 | Lee | H04W 74/006 370/329 |
| 2019/0150059 | A1* | 5/2019 | Vajapeyam | H04W 48/18 370/329 |

FOREIGN PATENT DOCUMENTS

| | | |
|---|---|---|
| CN | 106255122 A | 12/2016 |
| CN | 106255123 A | 12/2016 |
| CN | 106255124 A | 12/2016 |
| WO | 2016119454 A1 | 8/2016 |
| WO | 2016119466 A1 | 8/2016 |

* cited by examiner

COMMUNICATION METHOD AND COMMUNICATION DEVICE

CROSS-REFERENCE TO RELATED APPLICATIONS

The present disclosure claims a priority of a Chinese patent application, which is filed in China National Intellectual Property Administration (CNIPA) on Sep. 9, 2016, named "communication method and communication device," and numbered 201610818897.8. All contents of Chinese patent application are hereby incorporated by reference in the present application.

FIELD

The present disclosure relates to communication technologies, in particular to a communication method and a communication device.

BACKGROUND

With a rapid increase of communication services, 3rd Generation Partnership Project (3GPP) licensed spectrums become insufficient to provide higher network capacity. Therefore, the 3GPP proposes a concept of Long Term Evolution (LTE) Assisted Access (LAA), which uses unlicensed spectrums with the help of licensed spectrums. An LAA scheme is based on carrier aggregation to deploy LTE systems in unlicensed frequency bands.

The unlicensed spectrum can have two working modes. One is supplemental downlink (SDL), in which only downlink transmission subframes are included; the other is time-division duplex (TDD) mode, in which both uplink transmitting subframes and downlink transmitting subframes are included. SDL can only be used with the help of carrier aggregation technology. In addition to being used with the help of the carrier aggregation technology, the TDD mode can also be used with the help of Dual Connectivity (DC) or independently.

Existing schemes only address problems when the unlicensed spectrums and the LTE licensed spectrum work in a carrier aggregation manner, problems when the unlicensed spectrums and the LTE licensed spectrum work in a dual connectivity manner are not addressed. In many circumstances, a connection between a base station where an unlicensed spectrum is deployed and a base station where a licensed spectrum is located is not ideal, and only the dual connectivity manner can be used.

In the case of dual connectivity, a Secondary Evolved Node B (SeNB) needs a primary secondary cell (PSCell) to provide some functions of a primary cell (PCell), such as sending a Master Information Block (MIB). Information contained in the MIB mainly includes a System Frame Number (SFN), a downlink bandwidth, and Physical Hybrid ARQ Indicator Channel (PHICH) configurations. Only the SFN cannot be sent by the PCell. Furthermore, the MIB is transmitted in a period of 40 ms, and is repeatedly transmitted 4 times every 40 ms. The MIB is transmitted in subframe#0 of a radio frame with a SFN that is a multiple of 4 for the first time, and information same as in subframe#0 of the first radio frame is transmitted in subframe#0 of next three radio frames. Information transmitted within a next 40 ms may be different from information transmitted within a previous 40 ms.

In addition, on unlicensed spectrums, PCells working on unlicensed carriers, that is cells on unlicensed spectrums, can also be deployed to work independently (i.e., stand-alone), to implement communication control.

However, because it is required to use a Listening Before Talk (LBT) mechanism to occupy an unlicensed spectrum. If a channel is occupied by other devices, the MIB cannot be sent normally. As a result, users cannot receive the system frame of the MIB normally to perform a time synchronization, and the communication fails.

SUMMARY

Based on at least one of the above technical problems, the present disclosure proposes a new communication scheme, which improves a transmission probability of Master Information Block (MIB) of a primary cell group or a primary secondary cell group on an unlicensed frequency band, ensures that a user can receive the MIB in time to perform a time synchronization according to a System Frame Number (SFN) in the MIB, the communication is normal, and delay and efficiency requirements of communication are met.

In view of this, according to a first aspect of the disclosure, a communication method is proposed, the method including: configuring at least one serving cell for each terminal, each of the at least one serving cell working on an unlicensed carrier; selecting at least one of the at least one serving cell as a primary cell or a primary secondary cell of the terminal, the selected at least one serving cell forming a primary cell group or a primary secondary cell group of the terminal; and controlling the primary cell group or the primary secondary cell group to send a Master Information Block (MIB) to the terminal.

In the technical solution, when at least one of at least one serving cell working on an unlicensed frequency band is selected as a primary cell of the terminal, the selected at least one serving cell forming the primary cell group of the terminal, and the primary cell group sends the MIB to the terminal, it is a communication scenario in which the unlicensed frequency band works independently and the primary cell is deployed on the unlicensed frequency band. The channel cannot be continuously occupied on the unlicensed frequency band, that is, there is a channel detection mechanism. Therefore, the MIB can be sent to each terminal by the primary cell group. As such, a transmission probability of the MIB of the primary cell group to the terminal can be improved, a user can receive the MIB in time to perform a time synchronization according to a System Frame Number (SFN) in the MIB, the communication is normal, and delay and efficiency requirements of communication are met.

When at least one of at least one serving cell working on an unlicensed frequency band is selected as a primary secondary cell of the terminal, the selected at least one serving cell forming a primary secondary cell group of the terminal, and the primary secondary cell group sends the MIB to the terminal, it is a scenario in which an unlicensed frequency band and a licensed frequency band communicate in a dual connectivity manner. The channel cannot be continuously occupied on the unlicensed frequency band, that is, there is a channel detection mechanism. Therefore, the MIB can be sent to each terminal by the primary secondary cell group. As such, a transmission probability of the MIB of the primary secondary cell group to the terminal can be improved, a user can receive the MIB in time to perform a time synchronization according to a System Frame Number (SFN) in the MIB, the communication is normal, and delay and efficiency requirements of communication are met.

Regarding how to configure the at least one serving cell and how to select and form the primary cell group or the primary secondary cell group of each terminal, the present disclosure proposes the following three schemes:

Scheme 1:

A primary serving cell of a Master Evolved Node B working on a licensed frequency band configures the at least one serving cell on a Secondary Evolved Node B for each of the terminals. The primary serving cell selects the at least one of the at least one serving cell as the primary secondary cell on the Secondary Evolved Node B of the terminal, the selected at least one serving cell forming the primary secondary cell group on the Secondary Evolved Node B of the terminal.

Scheme 1 is applicable to a scenario in which an unlicensed frequency band and a licensed frequency band communicate in a dual connectivity manner. That is, the at least one serving cell is configured for each terminal by the primary serving cell of the Master Evolved Node B working on the licensed frequency band. The at least one serving cell for each terminal is selected by the primary serving cell to form the primary secondary cell group on the Secondary Evolved Node B of each terminal.

Scheme 2:

A primary serving cell of a Master Evolved Node B working on a licensed frequency band configures at least one primary secondary serving cell working on an unlicensed frequency band on a Secondary Evolved Node B for the terminal, the at least one primary secondary serving cell configuring zero (0) or at least one cell working on the unlicensed frequency band on the Secondary Evolved Node B for the terminal, wherein the 0 or at least one cell and the at least one primary secondary serving cell form the at least one serving cell. The at least one primary secondary serving cell selected the at least one of the at least one serving cell as the primary secondary cell on the Secondary Evolved Node B of the terminal, the selected at least one serving cell forming the primary secondary cell group on the Secondary Evolved Node B of the terminal.

Scheme 2 is also applicable to a scenario in which an unlicensed frequency band and a licensed frequency band communicate in a dual connectivity manner. That is, the primary serving cell of the Master Evolved Node B working on the licensed frequency band configure the at least one primary secondary serving cell on the Secondary Evolved Node B for each terminal. The at least one primary secondary serving cell configuring zero (0) or at least one cell working on the unlicensed frequency band on the Secondary Evolved Node B for the terminal, wherein the 0 or at least one cell and the at least one primary secondary serving cell form the at least one serving cell. Then the at least one primary secondary serving cell selects cells from the at least one serving cell to form the primary secondary cell group on the Secondary Evolved Node B of the terminal.

Furthermore, if an amount of the at least one primary secondary serving cell is more than one, configuration signaling used for configuring the 0 or at least one cell for the terminal are sent by one or more of the at least one primary secondary serving cell. The configuration signaling is Radio Resource Control (RRC) signaling.

Scheme 3:

A primary serving cell of a Master Evolved Node B working on an unlicensed frequency band configures 0 or at least one cell working on the unlicensed frequency band on the Master Evolved Node B for the terminal, wherein the 0 or at least one cell and the primary serving cell form the at least one serving cell. The primary serving cell selects the at least one of the at least one serving cell as the primary cell of the terminal, the selected at least one serving cell forming the primary cell group of the terminal.

Scheme 3 is applicable to a communication scenario in which an unlicensed frequency band works independently and the primary cell is deployed on the unlicensed frequency band. That is, the primary serving cell of the Master Evolved Node B working on the unlicensed frequency band configures 0 or at least one cell working on the unlicensed frequency band on the Master Evolved Node B for the terminal, the 0 or at least one cell and the primary serving cell form the at least one serving cell, and then the primary serving cell selects cells from the at least one serving cell, the selected cells form the primary cell group of the terminal.

In any one of the above technical solutions, the step of controlling the primary cell group or the primary secondary cell group to send a Master Information Block (MIB) to the terminal includes: controlling cells of the primary cell group or the primary secondary cell group that detect that a downlink channel is idle to send the MIB.

In the technical solution, considering the coexistence with other systems (such as a Wi-Fi system) in the unlicensed frequency band, that is, the requirement of introducing the LBT mechanism when working in the unlicensed frequency band, it is needed to control the cells of the primary cell group or the primary secondary cell group that detect that a downlink channel is idle to send the MIB.

Furthermore, if multiple cells of the primary cell group or the primary secondary cell group that detect that the downlink channel is idle, at least one of the multiple cells is controlled to send the MIB.

In the technical solution, if multiple cells detect that the downlink channel is idle, one or more of the multiple cells send the MIB.

In any one of the above technical solutions, the communication method further includes: if multiple cells of the primary cell group or the primary secondary cell group that detect that the downlink channel is idle, controlling the multiple cells to send the MIB non-concurrently.

In the technical solution, by controlling the multiple cells detecting that the downlink channel is idle to send the MIB non-concurrently, transmission opportunities of the MIB can be increased, ensuring that a user can receive the MIB in time to perform a time synchronization, and therefore ensuring a communication is normal.

In any one of the above technical solutions, the cells send the MIB in a period of 5 ms or 10 ms.

In the technical solution, by sending the MIB in the period of 5 ms or 10 ms (i.e. a smaller period), transmission opportunities of the MIB can be increased, ensuring that the user can receive the MIB in time to perform a time synchronization according to a System Frame Number in the MIBS, and therefore ensuring that a communication is normal.

In any one of the above technical solutions, if any cell of the primary cell group or the primary secondary group detects that the downlink channel corresponding to six consecutive resource blocks in a limited frequency domain is idle, the downlink channel is determined to be idle. A bandwidth of the limited frequency domain is equal to or less than a bandwidth of the cell and is greater than or equal to six resource blocks.

In the technical solution, only six resource blocks (RBs) are occupied to transmit the MIB, so that the cells of the primary cell group or the primary secondary cell group can perform a narrow-band channel detection. That is, as long as the downlink channel corresponding to six consecutive resource blocks on a specified limited frequency domain is detected to be idle, the downlink channel is determined to be idle.

In order to reduce complexity of user equipment detection and MBI reception, each six consecutive resource blocks is predefined with a number. That is, each six consecutive resource blocks is with a predefined resource block number, so that the user equipment can detect and receive the MIB at a defined position, reducing complexity of detection and reception of the user equipment.

In any one of the above technical solutions, the MIB can only send the SFN. Therefore, a sending time of the MIB is set to be greater than or equal to a time occupied by one symbol, and less than or equal to a time occupied by four symbols.

In any one the above technical solutions, the step of controlling any cell of the primary cell group or the primary secondary cell group that detect that the downlink channel is idle to send the MIB includes:

Controlling the cell to send the MIB in a remaining time of a subframe n when the downlink channel is detected to be idle during a channel detection of (16 μs+M×9 μs) at a starting position of the subframe n; or Controlling the cell to send the MIB in the subframe n when the downlink channel is detected to be idle during a channel detection of (16 μs+M×9 μs) at an end position of a subframe previous to the subframe n;

Wherein M is equal to one (1) or two (2).

In any one the above technical solutions, the operation of detecting, by any cell of the primary cell group or the primary secondary cell group, that the downlink channel is idle includes:

Selecting a random number from zero (0) to a contention window range when the downlink channel is detected to be idle for (16 μs+M×9 μs), wherein M is a positive integer; and Continuing detecting the downlink channel in a period of 9 μs after the random number is selected, keeping the random number unchanged when the downlink channel is detected to be busy, and decrementing the random number by 1 when the downlink channel is detected to be idle for (16 μs+M×9 μs); and decrementing the random number by 1 when the downlink channel is detects to be idle;

Determining that the downlink channel can be occupied when the random number is decremented to 0.

According to a second aspect of the present disclosure, a communication device is proposed, the communication device includes: a configuration unit configured to configure at least one serving cell for each terminal, each of the at least one serving cell working on an unlicensed carrier; a selection unit configured to select at least one serving cell from the at least one serving cell as a primary cell or a primary secondary cell of the terminal, the selected at least one serving cell forming a primary cell group or a primary secondary cell group of the terminal; and a communication control unit configured to control the primary cell group or the primary secondary cell group to send a Master Information Block (MIB) to the terminal.

In the technical solution, when at least one serving cell is selected from at least one serving cell working on an unlicensed frequency band as a primary cell of the terminal, the selected at least one serving cell forming the primary cell group of the terminal, and the primary cell group sends the MIB to the terminal, it is a communication scenario in which the unlicensed frequency band works independently and the primary cell is deployed on the unlicensed frequency band. The channel cannot be continuously occupied on the unlicensed frequency band, that is, there is a channel detection mechanism. Therefore, the MIB can be sent to each terminal by the primary cell group. As such, a transmission probability of the MIB of the primary cell group to the terminal can be improved, a user can receive the MIB in time to perform a time synchronization according to a System Frame Number (SFN) in the MIB, the communication is normal, and delay and efficiency requirements of communication are met.

When at least one of at least one serving cell working on an unlicensed frequency band is selected as a primary secondary cell of the terminal, the selected at least one serving cell forming a primary secondary cell group of the terminal, and the primary secondary cell group sends the MIB to the terminal, it is a scenario in which an unlicensed frequency band and a licensed frequency band communicate in a dual connectivity manner. The channel cannot be continuously occupied on the unlicensed frequency band, that is, there is a channel detection mechanism. Therefore, the MIB can be sent to each terminal by the primary secondary cell group. As such, a transmission probability of the MIB of the primary secondary cell group to the terminal can be improved, a user can receive the MIB in time to perform a time synchronization according to a System Frame Number (SFN) in the MIB, the communication is normal, and delay and efficiency requirements of communication are met.

Regarding how the configuration unit configures the at least one serving cell and how the selection unit selects and forms the primary cell group or the primary secondary cell group of each terminal, the present disclosure proposes the following three schemes:

Scheme 1:

The configuration unit is configured to control a primary serving cell of a Master Evolved Node B working on a licensed frequency band to configure the at least one serving cell on a Secondary Evolved Node B for each of the terminals. The selection unit is configured to control the primary serving cell to select the at least one serving cell from the at least one serving cell as the primary secondary cell on the Secondary Evolved Node B of the terminal, the selected at least one serving cell forming the primary secondary cell group on the Secondary Evolved Node B of the terminal.

Scheme 1 is applicable to a scenario in which an unlicensed frequency band and a licensed frequency band communicate in a dual connectivity manner. That is, the at least one serving cell is configured for each terminal by the primary serving cell of the Master Evolved Node B working on the licensed frequency band. The at least one serving cell for each terminal is selected by the primary serving cell, the selected at least one serving cell forming the primary secondary cell group on the Secondary Evolved Node B of each terminal.

Scheme 2:

The configuration unit is configured to control a primary serving cell of a Master Evolved Node B working on a licensed frequency band to configure at least one primary secondary serving cell working on an unlicensed frequency band on a Secondary Evolved Node B for the terminal, the at least one primary secondary serving cell configuring zero (0) or at least one cell working on the unlicensed frequency band on the Secondary Evolved Node B for the terminal, wherein the 0 or at least one cell and the at least one primary secondary serving cell form the at least one serving cell. The selection unit is configured to control the at least one primary secondary serving cell to select the at least one of the at least one serving cell as the primary secondary cell on the Secondary Evolved Node B of the terminal, the selected at least one serving cell forming the primary secondary cell group on the Secondary Evolved Node B of the terminal.

Scheme 2 is also applicable to a scenario in which an unlicensed frequency band and a licensed frequency band communicate in a dual connectivity manner. That is, the primary serving cell of the Master Evolved Node B working on the licensed frequency band configure the at least one primary secondary serving cell on the Secondary Evolved Node B for each terminal. The at least one primary secondary serving cell configuring zero (0) or at least one cell working on the unlicensed frequency band on the Secondary Evolved Node B for the terminal, wherein the 0 or at least one cell and the at least one primary secondary serving cell form the at least one serving cell. Then the at least one primary secondary serving cell selects cells from the at least one serving cell, the selected cells forming the primary secondary cell group on the Secondary Evolved Node B of the terminal.

Furthermore, if an amount of the at least one primary secondary serving cell is more than one, configuration signaling used for configuring the 0 or at least one cell for the terminal are sent by one or more of the at least one primary secondary serving cell. The configuration signaling is Radio Resource Control (RRC) signaling.

Scheme 3:

The configuration unit is configured to control a primary serving cell of a Master Evolved Node B working on an unlicensed frequency band to configure zero (0) or at least one cell working on the unlicensed frequency band on the Master Evolved Node B for the terminal, wherein the 0 or at least one cell and the primary serving cell form the at least one serving cell. The selection unit is configured to control the primary serving cell to select the at least one of the at least one serving cell as the primary cell of the terminal, the selected at least one serving cell forming the primary cell group of the terminal.

Scheme 3 is applicable to a communication scenario in which an unlicensed frequency band works independently and the primary cell is deployed on the unlicensed frequency band. That is, the primary serving cell of the Master Evolved Node B working on the unlicensed frequency band configures 0 or at least one cell working on the unlicensed frequency band on the Master Evolved Node B for the terminal, the 0 or at least one cell and the primary serving cell form the at least one serving cell, and then the primary serving cell selects cells from the at least one serving cell, the selected cells forming the primary cell group of the terminal.

In any one of the above technical solutions, the communication unit is configured to: control cells of the primary cell group or the primary secondary cell group that detect that a downlink channel is idle to send the MIB.

In the technical solution, considering the coexistence with other systems (such as a Wi-Fi system) in the unlicensed frequency band, that is, the requirement of introducing the LBT mechanism when working in the unlicensed frequency band, it is needed to control the cells of the primary cell group or the primary secondary cell group that detect that a downlink channel is idle to send the MIB.

In any one of the above technical solutions, the communication unit is further configured to: if multiple cells of the primary cell group or the primary secondary cell group that detect that the downlink channel is idle, control at least one of the multiple cells to send the MIB concurrently.

In the technical solution, if multiple cells detect that the downlink channel is idle, one or more of the multiple cells send the MIB.

In any one of the above technical solutions, the communication unit is further configured to: if multiple cells of the primary cell group or the primary secondary cell group that detect that the downlink channel is idle, control the multiple cells to send the MIB non-concurrently.

In the technical solution, by controlling the multiple cells detecting that the downlink channel is idle to send the MIB non-concurrently, transmission opportunities of the MIB can be increased, ensuring that a user can receive the MIB in time to perform a time synchronization, and therefore ensuring a communication is normal.

In any one of the above technical solutions, the cells send the MIB in a period of 5 ms or 10 ms.

In the technical solution, by sending the MIB in the period of 5 ms or 10 ms (i.e. a smaller period), transmission opportunities of the MIB can be increased, ensuring that the user can receive the MIB in time to perform a time synchronization according to a System Frame Number in the MIBS, and therefore ensuring that a communication is normal.

In any one of the above technical solutions, if any cell of the primary cell group or the primary secondary group detects that the downlink channel corresponding to six consecutive resource blocks in a limited frequency domain is idle, the downlink channel is determined to be idle. A bandwidth of the limited frequency domain is equal to or less than a bandwidth of the cell and is greater than or equal to six resource blocks.

In the technical solution, only six resource blocks are occupied to transmit the MIB, so that the cells of the primary cell group or the primary secondary cell group can perform a narrow-band channel detection. That is, as long as the downlink channel corresponding to six consecutive resource blocks on a specified limited frequency domain is detected idle, it can be determined that the downlink channel is idle.

In order to reduce complexity of user equipment detection and MBI reception, each six consecutive resource blocks is predefined with a number. That is, each six consecutive resource blocks is with a predefined resource block number, so that the user equipment can detect and receive the MIB at a defined position, reducing complexity of detection and reception of the user equipment.

In any one of the above technical solutions, the MIB can only send the SFN. Therefore, a sending time of the MIB is set to be greater than or equal to a time occupied by one symbol, and less than or equal to a time occupied by four symbols.

In any one of the above technical solutions, the operation, performed by the communication control unit, of controlling cells of the primary cell group or the primary secondary cell group that detect that the downlink channel is idle to send the MIB includes:

Controlling the cell to send the MIB in a remaining time of a subframe n when the downlink channel is detected to be idle during a channel detection of (16 µs+M×9 µs) at a starting position of the subframe n; or Controlling the cell to send the MIB in the subframe n when the downlink channel is detected to be idle during a channel detection of (16 µs+M×9 µs) at an end position of a subframe previous to the subframe n;

Wherein M is equal to one (1) or two (2).

In any one of the above technical solutions, the operation of detecting, by any cell of the primary cell group or the primary secondary cell group, that the downlink channel is idle includes:

Selecting a random number from zero (0) to a contention window range when the downlink channel is detected to be idle for (16 μs+M×9 μs), wherein M is a positive integer; and Continuing detecting the downlink channel in a period of 9 μs after the random number is selected, keeping the random number unchanged when the downlink channel is detected to be busy, and decrementing the random number by 1 when the downlink channel is detected to be idle for (16 μs+M×9 μs); and decrementing the random number by 1 when the downlink channel is detects to be idle;

Determining that the downlink channel can be occupied when the random number is decremented to 0.

According to a third aspect of the present disclosure, a communication method is proposed. The method includes: determining, by a terminal, a primary cell group or a primary secondary cell group working on unlicensed carriers; receiving a Master Information Block (MIB) sent by cells of the primary cell group or the primary secondary cell group; wherein the primary cell group or the primary secondary cell group is formed of cells selected from at least one serving cell working on the unlicensed carriers, each of the at least one serving cell working on one of the unlicensed carriers.

In the technical solution, when cells are selected from at least one serving cell working on an unlicensed frequency band to form the primary cell group of the terminal, it is a communication scenario in which the unlicensed frequency band works independently and the primary cell is deployed on the unlicensed frequency band. The channel cannot be continuously occupied on the unlicensed frequency band, that is, there is a channel detection mechanism. Therefore, the terminal receives the MIB sent by the primary cell group. As such, a transmission probability of the MIB of the primary cell group to the terminal can be improved, a user can receive the MIB in time to perform a time synchronization according to a System Frame Number (SFN) in the MIB, the communication is normal, and delay and efficiency requirements of communication are met.

When cells are selected from at least one serving cell working on an unlicensed frequency band to form a primary secondary cell group of the terminal, it is a scenario in which an unlicensed frequency band and a licensed frequency band communicate in a dual connectivity manner. The channel cannot be continuously occupied on the unlicensed frequency band, that is, there is a channel detection mechanism. Therefore, the MIB can be sent to each terminal by the primary secondary cell group. As such, a transmission probability of the MIB of the primary secondary cell group to the terminal can be improved, a user can receive the MIB in time to perform a time synchronization according to a System Frame Number (SFN) in the MIB, the communication is normal, and delay and efficiency requirements of communication are met.

The terminal determines the primary secondary cell group working on the unlicensed carriers by receiving notification signaling sent by a primary serving cell of a Master Evolved Node B on a licensed frequency band or a primary secondary cell of a Secondary Evolved Node B on an unlicensed frequency band.

According to a fourth aspect of the present disclosure, a communication device is proposed, including: a determination unit configured to determine a primary cell group or a primary secondary cell group working on unlicensed carriers, the primary cell group or the primary secondary cell group being formed of cells selected from at least one serving cell working on the unlicensed carriers, each of the at least one serving cell working on one of the unlicensed carriers; a communication unit configured to receive a Master Information Block (MIB) sent by cells of the primary cell group or the primary secondary cell group.

In the technical solution, When cells are selected from at least one serving cell working on an unlicensed frequency band to form the primary cell group of the terminal, it is a communication scenario in which the unlicensed frequency band works independently and the primary cell is deployed on the unlicensed frequency band. The channel cannot be continuously occupied on the unlicensed frequency band, that is, there is a channel detection mechanism. Therefore, the terminal receives the MIB sent by the primary cell group. As such, a transmission probability of the MIB of the primary cell group to the terminal can be improved, a user can receive the MIB in time to perform a time synchronization according to a System Frame Number (SFN) in the MIB, the communication is normal, and delay and efficiency requirements of communication are met.

When cells are selected from at least one serving cell working on an unlicensed frequency band to form a primary secondary cell group of the terminal, it is a scenario in which an unlicensed frequency band and a licensed frequency band communicate in a dual connectivity manner. The channel cannot be continuously occupied on the unlicensed frequency band, that is, there is a channel detection mechanism. Therefore, the MIB can be sent to each terminal by the primary secondary cell group. As such, a transmission probability of the MIB of the primary secondary cell group to the terminal can be improved, a user can receive the MIB in time to perform a time synchronization according to a System Frame Number (SFN) in the MIB, the communication is normal, and delay and efficiency requirements of communication are met.

The terminal determines the primary secondary cell group working on the unlicensed carriers by receiving notification signaling sent by a primary serving cell of a Master Evolved Node B on a licensed frequency band or a primary secondary cell of a Secondary Evolved Node B on an unlicensed frequency band.

By applying the above technical solutions, a transmission probability of the MIB of the primary cell group or the primary secondary cell group on the unlicensed frequency band can be improved, a user can receive the MIB in time to perform a time synchronization according to a System Frame Number (SFN) in the MIB, the communication is normal, and delay and efficiency requirements of communication are met.

DETAILED DESCRIPTION

In order to provide a more clear understanding of the objects, features and advantages of the present disclosure, the present disclosure may be further described in detail below with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. Thus, the following embodiments should not limit the scope of the present disclosure.

Figure 1:
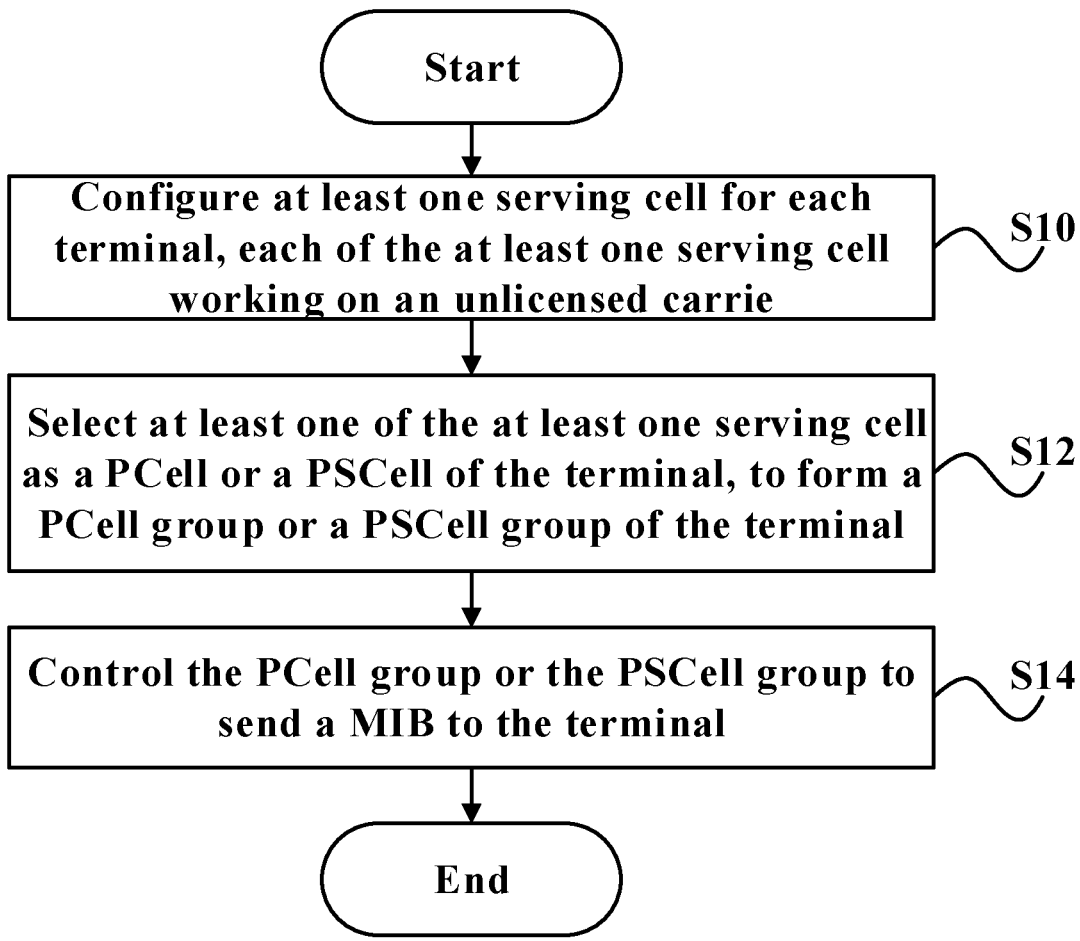
FIG. 1 shows a flow chart of a communication method according to a first embodiment of the present disclosure.

FIG. 1 shows a flow chart of a communication method according to a first embodiment of the present disclosure.

As shown in FIG. 1, the communication method according to the first embodiment of the present disclosure includes the following steps:

S10, configuring at least one serving cell for each terminal, each of the at least one serving cell working on an unlicensed carrier.

S12, selecting at least one of the at least one serving cell as a primary cell or a primary secondary cell of the terminal, the selected at least one serving cell forming a primary cell group or a primary secondary cell group of the terminal.

Regarding how to configure the at least one serving cell in step S10 and how to select and form the primary cell group or the primary secondary cell group of each terminal in step S12, the present disclosure proposes the following three schemes:

Scheme 1:

A primary serving cell of a Master Evolved Node B working on a licensed frequency band configures the at least one serving cell on a Secondary Evolved Node B for each of the terminals, wherein the primary serving cell selects the at least one of the at least one serving cell as the primary secondary cell on the Secondary Evolved Node B of the terminal, the selected at least one serving cell forming the primary secondary cell group on the Secondary Evolved Node B of the terminal.

Scheme 1 is applicable to a scenario in which an unlicensed frequency band and a licensed frequency band communicate in a dual connectivity manner. That is, the at least one serving cell is configured for each terminal by the primary serving cell of the Master Evolved Node B working on the licensed frequency band. At least one serving cell of the at least one serving cell for each terminal is selected by the primary serving cell, the selected at least one serving cell forming the primary secondary cell group on the Secondary Evolved Node B of each terminal.

Scheme 2:

A primary serving cell of a Master Evolved Node B working on a licensed frequency band configures at least one primary secondary serving cell working on an unlicensed frequency band on a Secondary Evolved Node B for the terminal, the at least one primary secondary serving cell configuring zero (0) or at least one cell working on the unlicensed frequency band on the Secondary Evolved Node B for the terminal, wherein the 0 or at least one cell and the at least one primary secondary serving cell form the at least one serving cell. The at least one primary secondary serving cell selects the at least one of the at least one serving cell as the primary secondary cell on the Secondary Evolved Node B of the terminal, the selected at least one serving cell forming the primary secondary cell group on the Secondary Evolved Node B of the terminal.

Scheme 2 is also applicable to a scenario in which an unlicensed frequency band and a licensed frequency band communicate in a dual connectivity manner. That is, the primary serving cell of the Master Evolved Node B working on the licensed frequency band configures the at least one primary secondary serving cell on the Secondary Evolved Node B for each terminal. The at least one primary secondary serving cell configures 0 or at least one cell working on the unlicensed frequency band on the Secondary Evolved Node B for the terminal. The 0 or at least one cell and the at least one primary secondary serving cell form the at least one serving cell. The at least one primary secondary serving cell selects cells from the at least one serving cell, the selected cells forming the primary secondary cell group on the Secondary Evolved Node B of the terminal.

Furthermore, if an amount of the at least one primary secondary serving cell is more than one, configuration signaling used for configuring the 0 or at least one cell for the terminal are sent by one or more of the at least one primary secondary serving cell. The configuration signaling may be Radio Resource Control (RRC) signaling.

Scheme 3:

A primary serving cell of a Master Evolved Node B working on an unlicensed frequency band configures 0 or at least one cell working on the unlicensed frequency band on the Master Evolved Node B for the terminal, wherein the 0 or at least one cell and the primary serving cell form the at least one serving cell. The primary serving cell selects the at least one serving cell of the at least one serving cell as the primary cell of the terminal, the selected at least one serving cell forming the primary cell group of the terminal.

Scheme 3 is applicable to a communication scenario in which an unlicensed frequency band works independently and the primary cell is deployed on the unlicensed frequency band. That is, the primary serving cell of the Master Evolved Node B working on the unlicensed frequency band configures 0 or at least one cell working on the unlicensed frequency band on the Master Evolved Node B for the terminal, the 0 or at least one cell and the primary serving cell form the at least one serving cell, and then the primary serving cell selects cells from the at least one serving cell, the selected cells forming the primary cell group of the terminal.

The communication method shown in FIG. 1 may further include:

S14, controlling the primary cell group or the primary secondary cell group to send a Master Information Block (MIB) to the terminal.

The following describes in detail the process of the primary cell group or the primary secondary cell group sending the MIB to the terminal:

In one embodiment of the present disclosure, the step of S14 specifically includes: controlling cells of the primary cell group or the primary secondary cell group that detect that a downlink channel is idle to send the MIB.

In the technical solution, considering the coexistence with other systems (such as a Wi-Fi system) in the unlicensed frequency band, that is, the requirement of introducing the LBT mechanism when working in the unlicensed frequency band, it is needed to control the cells of the primary cell group or the primary secondary cell group that detect that a downlink channel is idle to send the MIB.

Furthermore, if multiple cells of the primary cell group or the primary secondary cell group that detect that the downlink channel is idle, at least one of the multiple cells is controlled to send the MIB concurrently.

In the technical solution, if multiple cells detect that the downlink channel is idle, one or more of the multiple cells send the MIB.

Furthermore, the communication method may further include: if multiple cells of the primary cell group or the primary secondary cell group that detect that the downlink channel is idle, controlling the multiple cells to send the MIB non-concurrently.

In the technical solution, by controlling the multiple cells detecting that the downlink channel is idle to send the MIB non-concurrently, transmission opportunities of the MIB can be increased, ensuring that a user can receive the MIB in time to perform a time synchronization, and therefore ensuring a communication is normal.

In any one of the above technical solutions, the cells send the MIB in a period of 5 ms or 10 ms.

In the technical solution, by sending the MIB in the period of 5 ms or 10 ms (i.e. a smaller period), transmission opportunities of the MIB can be increased, ensuring that the user can receive the MIB in time to perform a time synchronization according to a System Frame Number in the MIBS, and therefore ensuring that a communication is normal.

In any one of the above technical solutions, if any cell of the primary cell group or the primary secondary group detects that the downlink channel corresponding to six consecutive resource blocks in a limited frequency domain is idle, the downlink channel is determined to be idle. A bandwidth of the limited frequency domain is equal to or less than a bandwidth of the cell and is greater than or equal to six resource blocks.

In the technical solution, only six resource blocks are occupied to transmit the MIB, so that the cells of the primary cell group or the primary secondary cell group can perform a narrow-band channel detection. That is, as long as the downlink channel corresponding to six consecutive resource blocks on a specified limited frequency domain is detected idle, it can be determined that the downlink channel is idle.

In order to reduce complexity of user equipment detection and MBI reception, each six consecutive resource blocks may be predefined with a number. That is, each six consecutive resource blocks is with a predefined resource block number, so that the user equipment can detect and receive the MIB at a defined position, reducing complexity of detection and reception of the user equipment.

In any one of the above technical solutions, the MIB can only send the SFN. Therefore, a sending time of the MIB may be set to be greater than or equal to a time occupied by one symbol, and less than or equal to a time occupied by four symbols.

Channel detection mechanisms of any cell of the primary cell group or the primary secondary cell group mainly include the following two:

Channel detection mechanism 1:

Controlling the cell to send the MIB in a remaining time of a subframe n when the downlink channel is detected to be idle during a channel detection of (16 μs+M×9 μs) at a starting position of the subframe n; or Controlling the cell to send the MIB in the subframe n when the downlink channel is detected to be idle during a channel detection of (16 μs+M×9 μs) at an end position of a subframe previous to the subframe n;

Wherein M is equal to one (1) or two (2).

Channel detection mechanism 2:

Selecting a random number from zero (0) to a contention window range when the downlink channel is detected to be idle for (16 μs+M×9 μs), wherein M is a positive integer; and Continuing detecting the downlink channel in a period of 9 μs after the random number is selected, keeping the random number unchanged when the downlink channel is detected to be busy, and decrementing the random number by 1 when the downlink channel is detected to be idle for (16 μs+M×9 μs); and decrementing the random number by 1 when the downlink channel is detects to be idle;

Determining that the downlink channel can be occupied when the random number is decremented to 0.

In the communication method shown in FIG. 1, the channel cannot be continuously occupied on the unlicensed frequency band, that is, there is a channel detection mechanism. Therefore, the MIB can be sent to each terminal by the primary cell group or the primary secondary cell group. As such, a transmission probability of the MIB of the primary cell group or the primary secondary cell group to the terminal can be improved, a user can receive the MIB in time to perform a time synchronization according to a System Frame Number (SFN) in the MIB, the communication is normal, and delay and efficiency requirements of communication are met.

Figure 2:
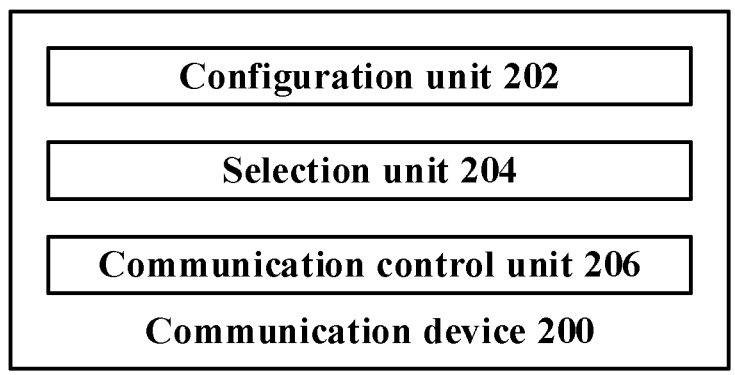
FIG. 2 shows a schematic structural diagram of a communication device according to a first embodiment of the present disclosure.

FIG. 2 shows a schematic structural diagram of a communication device according to a first embodiment of the present disclosure.

As shown in FIG. 2, the communication device 200 according to the first embodiment of the present disclosure includes a configuration unit 202, a selection unit 204, and a communication control unit 206.

The configuration unit 202 is configured to configure at least one serving cell for each terminal, each of the at least one serving cell working on an unlicensed carrier. The selection unit 204 is configured to select at least one serving cell from the at least one serving cell as a primary cell or a primary secondary cell of the terminal, the selected at least one serving cell forming a primary cell group or a primary secondary cell group of the terminal. The communication control unit 206 is configured to control the primary cell group or the primary secondary cell group to send a Master Information Block (MIB) to the terminal.

In the technical solution, when at least one serving cell is selected from at least one serving cell working on an unlicensed frequency band as a primary cell of the terminal, to form the primary cell group of the terminal, and the primary cell group sends the MIB to the terminal, it is a communication scenario in which the unlicensed frequency band works independently and the primary cell is deployed on the unlicensed frequency band. The channel cannot be continuously occupied on the unlicensed frequency band, that is, there is a channel detection mechanism. Therefore, the MIB can be sent to each terminal by the primary cell group. As such, a transmission probability of the MIB of the primary cell group to the terminal can be improved, a user can receive the MIB in time to perform a time synchronization according to a System Frame Number (SFN) in the MIB, the communication is normal, and delay and efficiency requirements of communication are met.

When at least one of at least one serving cell working on an unlicensed frequency band is selected as a primary secondary cell of the terminal, to form a primary secondary cell group of the terminal, and the primary secondary cell group sends the MIB to the terminal, it is a scenario in which an unlicensed frequency band and a licensed frequency band communicate in a dual connectivity manner. The channel cannot be continuously occupied on the unlicensed frequency band, that is, there is a channel detection mechanism. Therefore, the MIB can be sent to each terminal by the primary secondary cell group. As such, a transmission probability of the MIB of the primary secondary cell group to the terminal can be improved, a user can receive the MIB in time to perform a time synchronization according to a System Frame Number (SFN) in the MIB, the communication is normal, and delay and efficiency requirements of communication are met.

Regarding how the configuration unit 202 configures the at least one serving cell and how the selection unit 204 selects and forms the primary cell group or the primary secondary cell group of each terminal, the present disclosure proposes the following three schemes:

Scheme 1:

The configuration unit 202 is configured to control a primary serving cell of a Master Evolved Node B working on a licensed frequency band to configure the at least one serving cell on a Secondary Evolved Node B for each of the terminals. The selection unit 204 is configured to control the primary serving cell to select the at least one serving cell from the at least one serving cell as the primary secondary cell on the Secondary Evolved Node B of the terminal, the selected at least one serving cell forming the primary secondary cell group on the Secondary Evolved Node B of the terminal.

Scheme 1 is applicable to a scenario in which an unlicensed frequency band and a licensed frequency band communicate in a dual connectivity manner. That is, the at least one serving cell is configured for each terminal by the primary serving cell of the Master Evolved Node B working on the licensed frequency band. The at least one serving cell for each terminal is selected by the primary serving cell to form the primary secondary cell group on the Secondary Evolved Node B of each terminal.

Scheme 2:

The configuration unit 202 is configured to control a primary serving cell of a Master Evolved Node B working on a licensed frequency band to configure at least one primary secondary serving cell working on an unlicensed frequency band on a Secondary Evolved Node B for the terminal, the at least one primary secondary serving cell configuring zero (0) or at least one cell working on the unlicensed frequency band on the Secondary Evolved Node B for the terminal, wherein the 0 or at least one cell and the at least one primary secondary serving cell form the at least one serving cell. The selection unit 204 is configured to control the at least one primary secondary serving cell to select the at least one of the at least one serving cell as the primary secondary cell on the Secondary Evolved Node B of the terminal, the selected at least one serving cell forming the primary secondary cell group on the Secondary Evolved Node B of the terminal.

Scheme 2 is also applicable to a scenario in which an unlicensed frequency band and a licensed frequency band communicate in a dual connectivity manner. That is, the primary serving cell of the Master Evolved Node B working on the licensed frequency band configure the at least one primary secondary serving cell on the Secondary Evolved Node B for each terminal. The at least one primary secondary serving cell configuring zero (0) or at least one cell working on the unlicensed frequency band on the Secondary Evolved Node B for the terminal, wherein the 0 or at least one cell and the at least one primary secondary serving cell form the at least one serving cell. Then the at least one primary secondary serving cell selects cells from the at least one serving cell, the selected cells forming the primary secondary cell group on the Secondary Evolved Node B of the terminal.

Furthermore, if an amount of the at least one primary secondary serving cell is more than one, configuration signaling used for configuring the 0 or at least one cell for the terminal are sent by one or more of the at least one primary secondary serving cell. The configuration signaling may be Radio Resource Control (RRC) signaling.

Scheme 3:

The configuration unit 202 is configured to control a primary serving cell of a Master Evolved Node B working on an unlicensed frequency band to configure zero (0) or at least one cell working on the unlicensed frequency band on the Master Evolved Node B for the terminal, wherein the 0 or at least one cell and the primary serving cell form the at least one serving cell. The selection unit 204 is configured to control the primary serving cell to select the at least one serving cell from the at least one serving cell as the primary cell of the terminal, the selected at least one serving cell forming the primary cell group of the terminal.

Scheme 3 is applicable to a communication scenario in which an unlicensed frequency band works independently and the primary cell is deployed on the unlicensed frequency band. That is, the primary serving cell of the Master Evolved Node B working on the unlicensed frequency band configures 0 or at least one cell working on the unlicensed frequency band on the Master Evolved Node B for the terminal, the 0 or at least one cell and the primary serving cell form the at least one serving cell, and then the primary serving cell selects cells from the at least one serving cell to form the primary cell group of the terminal.

In any one of the above technical solutions, the communication unit 206 may be configured to: control cells of the primary cell group or the primary secondary cell group that detect that a downlink channel is idle to send the MIB.

In the technical solution, considering the coexistence with other systems (such as a Wi-Fi system) in the unlicensed frequency band, that is, the requirement of introducing the LBT mechanism when working in the unlicensed frequency band, it is needed to control the cells of the primary cell group or the primary secondary cell group that detect that a downlink channel is idle to send the MIB.

Furthermore, the communication unit 206 may be further configured to: if multiple cells of the primary cell group or the primary secondary cell group that detect that the downlink channel is idle, control at least one of the multiple cells to send the MIB concurrently.

In the technical solution, if multiple cells detect that the downlink channel is idle, one or more of the multiple cells send the MIB.

Furthermore, the communication unit 206 may be further configured to: if multiple cells of the primary cell group or the primary secondary cell group that detect that the downlink channel is idle, control the multiple cells to send the MIB non-concurrently.

In the technical solution, by controlling the multiple cells detecting that the downlink channel is idle to send the MIB non-concurrently, transmission opportunities of the MIB can be increased, ensuring that a user can receive the MIB in time to perform a time synchronization, and therefore ensuring a communication is normal.

In any one of the above technical solutions, the cells send the MIB in a period of 5 ms or 10 ms.

In the technical solution, by sending the MIB in the period of 5 ms or 10 ms (i.e. a smaller period), transmission opportunities of the MIB can be increased, ensuring that the user can receive the MIB in time to perform a time synchronization according to a System Frame Number in the MIBS, and therefore ensuring that a communication is normal.

In any one of the above technical solutions, if any cell of the primary cell group or the primary secondary group detects that the downlink channel corresponding to six consecutive resource blocks in a limited frequency domain is idle, the downlink channel is determined to be idle. A bandwidth of the limited frequency domain is equal to or less than a bandwidth of the cell and is greater than or equal to six resource blocks.

In the technical solution, only six resource blocks are occupied to transmit the MIB, so that the cells of the primary cell group or the primary secondary cell group can perform a narrow-band channel detection. That is, as long as the downlink channel corresponding to six consecutive resource blocks on a specified limited frequency domain is detected idle, it can be determined that the downlink channel is idle.

In order to reduce complexity of user equipment detection and MBI reception, each six consecutive resource blocks may be predefined with a number. That is, each six consecutive resource blocks is with a predefined resource block number, so that the user equipment can detect and receive the MIB at a defined position, reducing complexity of detection and reception of the user equipment.

In any one of the above technical solutions, the MIB can only send the SFN. Therefore, a sending time of the MIB may be set to be greater than or equal to a time occupied by one symbol, and less than or equal to a time occupied by four symbols.

Channel detection mechanisms of any cell of the primary cell group or the primary secondary cell group mainly include the following two:

Channel detection mechanism 1:

Controlling the cell to send the MIB in a remaining time of a subframe n when the downlink channel is detected to be idle during a channel detection of (16 μs+M×9 μs) at a starting position of the subframe n; or controlling the cell to send the MIB in the subframe n when the downlink channel is detected to be idle during a channel detection of (16 μs+M×9 μs) at an end position of a subframe previous to the subframe n;

Wherein M is equal to one (1) or two (2).

Channel detection mechanism 2:

Selecting a random number from zero (0) to a contention window range when the downlink channel is detected to be idle for (16 μs+M×9 μs), wherein M is a positive integer; and Continuing detecting the downlink channel in a period of 9 μs after the random number is selected, keeping the random number unchanged when the downlink channel is detected to be busy, and decrementing the random number by 1 when the downlink channel is detected to be idle for (16 μs+M×9 μs); and decrementing the random number by 1 when the downlink channel is detects to be idle;

Determining that the downlink channel can be occupied when the random number is decremented to 0.

Figure 3:
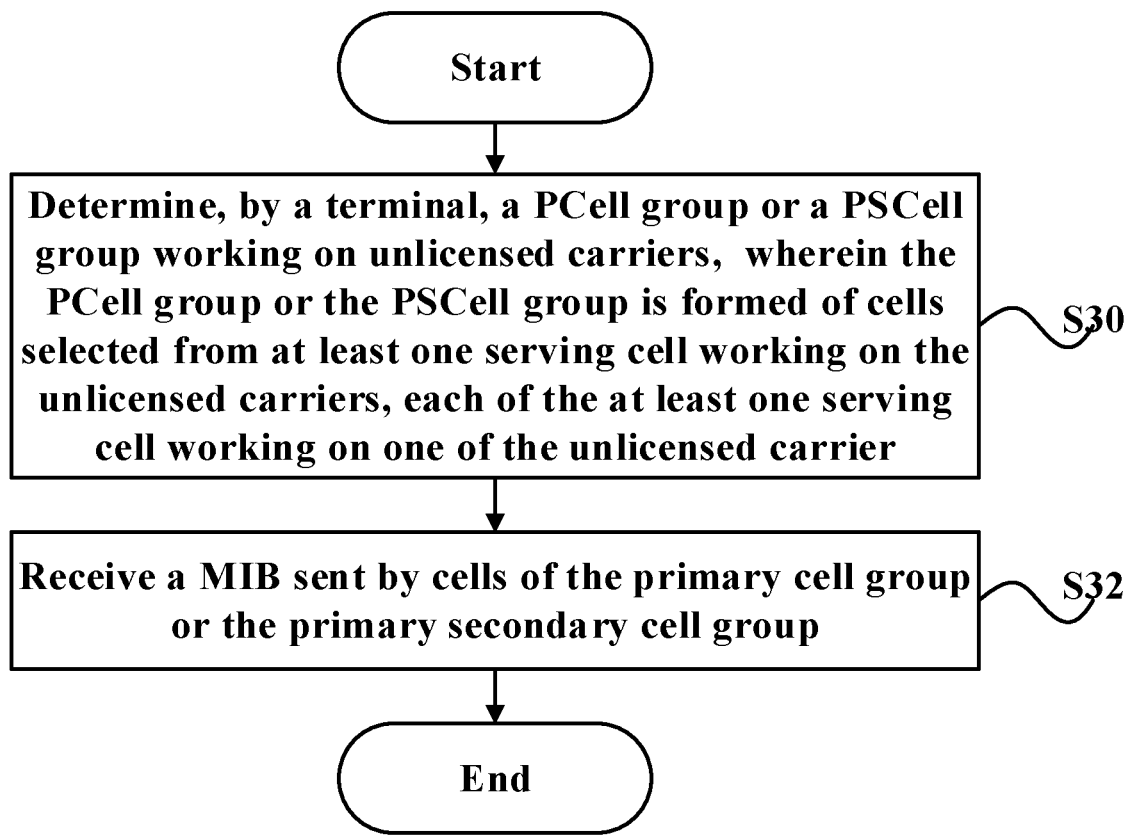
FIG. 3 shows a flow chart of a communication method according to a second embodiment of the present disclosure.

FIG. 3 shows a flow chart of a communication method according to a second embodiment of the present disclosure.

As shown in FIG. 3 the communication method according to the second embodiment of the present disclosure includes the following steps:

S30, determining, by a terminal, a primary cell group or a primary secondary cell group working on unlicensed carriers. The primary cell group or the primary secondary cell group is formed of cells selected from at least one serving cell working on the unlicensed carriers. Each of the at least one serving cell working on one of the unlicensed carrier.

The terminal may determine the primary secondary cell group working on the unlicensed carriers by receiving notification signaling sent by a primary serving cell of a Master Evolved Node B on a licensed frequency band or a primary secondary cell of a Secondary Evolved Node B on an unlicensed frequency band.

S32, receiving a Master Information Block (MIB) sent by cells of the primary cell group or the primary secondary cell group;

In the technical solution, when cells are selected from at least one serving cell working on an unlicensed frequency band to form the primary cell group of the terminal, it is a communication scenario in which the unlicensed frequency band works independently and the primary cell is deployed on the unlicensed frequency band. The channel cannot be continuously occupied on the unlicensed frequency band, that is, there is a channel detection mechanism. Therefore, the terminal receives the MIB sent by the primary cell group. As such, a transmission probability of the MIB of the primary cell group to the terminal can be improved, a user can receive the MIB in time to perform a time synchronization according to a System Frame Number (SFN) in the MIB, the communication is normal, and delay and efficiency requirements of communication are met.

When cells are selected from at least one serving cell working on an unlicensed frequency band to form a primary secondary cell group of the terminal, it is a scenario in which an unlicensed frequency band and a licensed frequency band communicate in a dual connectivity manner. The channel cannot be continuously occupied on the unlicensed frequency band, that is, there is a channel detection mechanism. Therefore, the MIB can be sent to each terminal by the primary secondary cell group. As such, a transmission probability of the MIB of the primary secondary cell group to the terminal can be improved, a user can receive the MIB in time to perform a time synchronization according to a System Frame Number (SFN) in the MIB, the communication is normal, and delay and efficiency requirements of communication are met.

Figure 4:
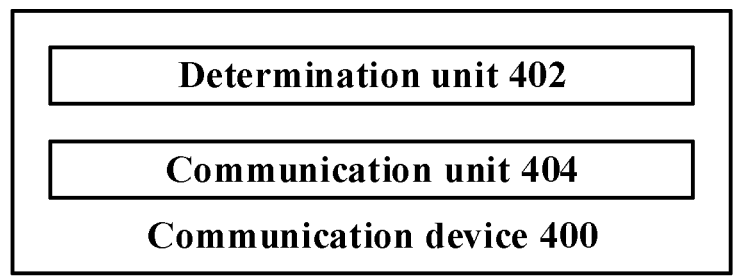
FIG. 4 shows a schematic structural diagram of a communication device according to a second embodiment of the present disclosure.

FIG. 4 shows a schematic structural diagram of a communication device according to a second embodiment of the present disclosure.

As shown in FIG. 4, the communication device 400 according to the first embodiment of the present disclosure includes a determination unit 402 and a communication unit 404.

The determination unit 402 is configured to determine a primary cell group or a primary secondary cell group working on unlicensed carriers. The primary cell group or the primary secondary cell group contains cells selected from at least one serving cell working on the unlicensed carriers. Each of the at least one serving cell works on one of the unlicensed carriers. The communication unit 404 is configured to receive a Master Information Block (MIB) sent by cells of the primary cell group or the primary secondary cell group.

In the technical solution, when cells are selected from at least one serving cell working on an unlicensed frequency band to form the primary cell group of the terminal, it is a communication scenario in which the unlicensed frequency band works independently and the primary cell is deployed on the unlicensed frequency band. The channel cannot be continuously occupied on the unlicensed frequency band, that is, there is a channel detection mechanism. Therefore, the terminal receives the MIB sent by the primary cell group. As such, a transmission probability of the MIB of the primary cell group to the terminal can be improved, a user can receive the MIB in time to perform a time synchronization according to a System Frame Number (SFN) in the MIB, the communication is normal, and delay and efficiency requirements of communication are met.

When cells are selected from at least one serving cell working on an unlicensed frequency band to form a primary secondary cell group of the terminal, it is a scenario in which an unlicensed frequency band and a licensed frequency band communicate in a dual connectivity manner. The channel cannot be continuously occupied on the unlicensed frequency band, that is, there is a channel detection mechanism. Therefore, the MIB can be sent to each terminal by the primary secondary cell group. As such, a transmission probability of the MIB of the primary secondary cell group to the terminal can be improved, a user can receive the MIB in time to perform a time synchronization according to a System Frame Number (SFN) in the MIB, the communication is normal, and delay and efficiency requirements of communication are met.

The determination unit 402 may determine the primary secondary cell group working on the unlicensed carriers by receiving notification signaling sent by a primary serving cell of a Master Evolved Node B on a licensed frequency band or a primary secondary cell of a Secondary Evolved Node B on an unlicensed frequency band.

In summary, the embodiments of the present disclosure mainly improves the transmission probability of the MIB by using the primary cell group (PCell Group) or the primary secondary cell group (PSCell Group) working on the unlicensed frequency band, and thus The user is guaranteed to receive the MIB in time to perform time synchronization according to the system frame number in the MIB, thereby ensuring normal communication and meeting the communication delay and efficiency requirements. As such, a user can receive the MIB in time to perform a time synchronization according to a System Frame Number (SFN) in the MIB, the communication is normal. and delay and efficiency requirements of communication are met.

Specifically, the present disclosure mainly includes the following aspects:

A. Configuration of PCell Group or PSCell Group.

1. Configuration of PCell Group:

A PCell of a Master Evolved Node B (MeNB) working on an unlicensed frequency band configures 0 or at least one cell working on a Master Evolved Node B on the unlicensed frequency band for each terminal. The Pcell selects 0 or at least one cell from the 0 or at least one cell, the selected 0 or at least one cell forming a PCell group of the terminal with the PCell.

Each of the at least one cell works on an unlicensed carrier, for example, Cell#1 is configured on an unlicensed carrier 1, Cell#2 is configured on an unlicensed carrier 2, Cell#3 is configured on ab unlicensed carrier 3 . . . Cell#M is configured on an unlicensed carrier M. The PCell selects 0 or at least one cell and forms the PCell Group for each terminal with the PCell. An amount of cells in the PCell Group can have an upper limit, such as a maximum of 2, 3, or other values. For different users, the PCell Group is independent, that is, PCell Groups of different users can be the same or different.

2. Configuration of PSCell Group:

Scheme 1:

A PCell of a Master Evolved Node B (MeNB) working on a licensed frequency band configures at least one serving cell on a Secondary Evolved Node B (SeNB) working on an unlicensed frequency band for each terminal. The PCell selects at least one serving cell from the at least one serving cell as a PSCell on the SeNB of the terminal, the selected at least one serving cell forming a PSCell Group on the SeNB of the terminal.

Each of the at least one serving cell works on an unlicensed carrier, for example, SCell#1 is configured on an unlicensed carrier 1, SCell#2 is configured on an unlicensed carrier 2, SCell#3 is configured on ab unlicensed carrier 3 . . . SCell#M is configured on an unlicensed carrier M. The PSCell selects at least one Scell, the selected at least one Scell forming the PSCell Group of each terminal. An amount of cells in the PSCell Group can have an upper limit, such as a maximum of 2, 3, or other values. For different users, the PSCell Group is independent, that is, PSCell Groups of different users can be same or different.

Scheme 2:

A PCell of a Master Evolved Node B (MeNB) working on a licensed frequency band configures PSCell working on an unlicensed frequency band on a Secondary Evolved Node B (SeNB) for each terminal. The PSCell configures o or at least one cell working on the unlicensed frequency band on the SeNB for the terminal. The PSCell selects 0 or at least one cell from the o or at least one cell, the selected 0 or at least one cell forming the PSCell Group of the terminal with the PSCell.

Each of the at least one cell works on an unlicensed carrier, for example, SCell#1 is configured on an unlicensed carrier 1, SCell#2 is configured on an unlicensed carrier 2, SCell#3 is configured on ab unlicensed carrier 3 . . . SCell#M is configured on an unlicensed carrier M. The PSCell selects 0 or at least one SCell to form the PSCell Group for the terminal with the PSCell. An amount of cells in the PSCell Group can have an upper limit, such as a maximum of 2, 3, or other values. For different users, the PSCell Group is independent, that is, PSCell Groups of different users can be same or different.

3. An embodiment of selecting PSCell in the PSCell Group:

SCells are first selected to form an SCell Group, and one or more cells are further selected as PSCells from the SCell Group to form a PSCell Group.

Event A3, Event A4, Event A5, and the like of LTE can be used to select the SCells.

For example, when Event A3 is used, if service quality of a neighboring cell is higher than that of a current serving cell, the neighboring cell is added to the SCell Group. When Event A4 is used, if the service quality of the neighboring cell is higher than a threshold, the neighboring cell is added to the SCell Group. When Event A5 is used, if the serving quality of the serving cell is lower than a threshold and the service quality of the neighboring cell is higher than the threshold, the neighboring cell is added to the SCell Group.

4. Addition, removal, and replacement of PSCells within the PSCell Group:

(1) Addition of PSCells.

All SCells are sorted in descending order. An ordering criteria may be: RSRP/RSRQ from large to small and/or channel occupancy from low to high. SCells that are ranked first and satisfy a predetermined requirement are sequentially selected as PSCell #1, PSCell #2, . . . , until the selected PSCells reach a maximum number or all SCells are selected. The predetermined requirement is that the RSRP/RSRQ is greater than a threshold, and/or the channel occupancy is less than a threshold.

(2) Removal of PSCells.

When the RSRP/RSRQ of a PSCell in the PSCell Group is less than a certain threshold, and/or the channel occupancy is greater than a threshold, the PSCell is removed from the PSCell Group.

(2) Replacement of PSCells.

Method 1: If an RSRP/RSRQ of a certain SCell is higher than the RSRP/RSRQ of a PSCell in the PSCell Group, and/or the channel occupancy of a certain SCell is lower than the channel occupancy of the PSCell, the PSCell is then replaced by the SCell.

Method 2: If an RSell/RSRQ of an SCell is higher than a threshold of 1, and/or the channel occupancy is lower than a threshold of 2; and the RSRP/RSRQ of a PSCell in the PSCell Group is lower than a threshold of 3, and/or the channel occupancy is higher than a threshold of 4, the PSCell is replaced by the SCell.

5. The scheme of adding, removing, and replacing PCells in the PCell Group is similar to the scheme of adding, removing, and replacing PSCells in the PSCell Group, and details are not described herein.

B. The PCell Group or the PSCell Group sends the MIB.

1. Each PCell in the PCell Group independently performs LBT channel detection (different PCells may use the same LBT mechanism, or different LBT mechanisms may be used). If multiple PCells detect that a channel is idle, only one Pcell is used to send the MIB concurrently. The priority of the PCells that send the MIB can be predefined. For example, a PCell with a lowest number sends the MIB preferentially. The PCell with the lowest number indicates the PCell with a largest RSRP/RSRQ and/or a lowest channel occupancy.

Similarly, each PSCell in the PSCell Group independently performs LBT channel detection (different PSCells may use the same LBT mechanism, or different LBT mechanisms may be used). If multiple PSCell detect that a channel is idle, only one PSCell is used to send the MIB concurrently. The priority of the PSCells that send the MIB may be predefined. For example, a PSCell with a lowest number sends the MIB preferentially. The PSCell with the lowest number indicates the PSCell with a largest RSRP/RSRQ and/or a lowest channel occupancy.

2. Transmission opportunity of the MIB is enhanced by the following two methods:

Method 1: the MIB is repeatedly sent in a small period, for example, the MIB is repeatedly sent in a period of 5 ms or 10 ms. The method is applicable to both PCell in the PCell Group and PSCell in the PSCell Group.

Method 2: different PCells that detect that the channel is idle in the PCell Group send the MIB non-concurrently. For example, PCell#1 is sent in subframe#0; PCell#2 is sent in subframe#5. As such, it is avoided that when other devices use carrier aggregation, multiple carriers may be occupied sometimes and the MIB cannot be sent.

Similarly, different PSCells that detect that the channel is idle in the PSCell Group send the MIB non-concurrently. For example, PSCell#1 is sent in subframe#0; PSCell#2 is sent in subframe#5. As such, it is also avoided that when other devices use carrier aggregation, multiple carriers may be occupied sometimes and the MIB cannot be sent.

3. The MIB only needs to occupy a resource of 6 resource blocks (RBs) during transmission. Therefore, the LBT mechanism for sending the MIB can be used in a narrow-band channel detection. In addition, in order to improve the transmission probability, the MIB can be sent on any 6 consecutive RBs. Therefore, as long as 6 consecutive RBs is detected to be idle on an unlicensed carrier where any PCell in the PCell Group or any PSCell in the PSCell Group is located, the MIB can be sent.

However, the processing method may increase a receiving complexity of a user equipment. The user equipment needs to detect any 6 RBs of entire bandwidth of an unlicensed carrier. To reduce a detection complexity of the user equipment, the 6 RBs can give certain restrictions. For example, a starting position of the 6 RBs may be limited as a number of a multiple of 6. For example, the number of the 6 RBs can be 0~5, 6~11, 12~17, and the like.

4. Since the MIB only needs to send a System Frame Number, the sending time of the MIB can be redesigned. For example, the sending time of the MIB can be set to be less than or equal to a duration occupied by 4 symbols, for example, the sending time of the MIB is a time occupied by 2 symbols.

5. The LBT mechanism of any cell in the PCell Group or the PSCell Group mainly includes the following two:

(1) LBT mechanism 1:

Controlling the cell to send the MIB in a remaining time of a subframe n when the downlink channel is detected to be idle during a channel detection of (16 µs+M×9 µs) at a starting position of the subframe n; or Controlling the cell to send the MIB in the subframe n when the downlink channel is detected to be idle during a channel detection of (16 µs+M×9 µs) at an end position of a subframe previous to the subframe n;

Wherein M is equal to one (1) or two (2).

Specifically, for example, a certain cell performs channel detection at first 25 µs of subframe#0. If the channel is detected to be idle, the MIB is sent at a next time of subframe#0 Or the cell performs the channel detection at last 25 µs of subframe #9 perious to subframe #0. If the channel is detected to be idle, the MIB is sent at subframe #0.

It should be noted that the channel detection time of 25 µs is divided into 16 µs and 9 µs. The channel is idle in 25 µs means: the channel is continuously idle in first 9 µs of the 16 µs; and the channel is continuously idle in any 4 µs of the 9 µs.

(2) LBT mechanism 2:

Selecting a random number from zero (0) to a contention window range when the downlink channel is detected to be idle for (16 µs+M×9 µs), wherein M is a positive integer; and Continuing detecting the downlink channel in a period of 9 µs after the random number is selected, keeping the random number unchanged when the downlink channel is detected to be busy, and decrementing the random number by 1 when the downlink channel is detected to be idle for (16 µs+M×9 µs); and decrementing the random number by 1 when the downlink channel is detects to be idle;

Determining that the downlink channel can be occupied when the random number is decremented to 0.

Figure 5:
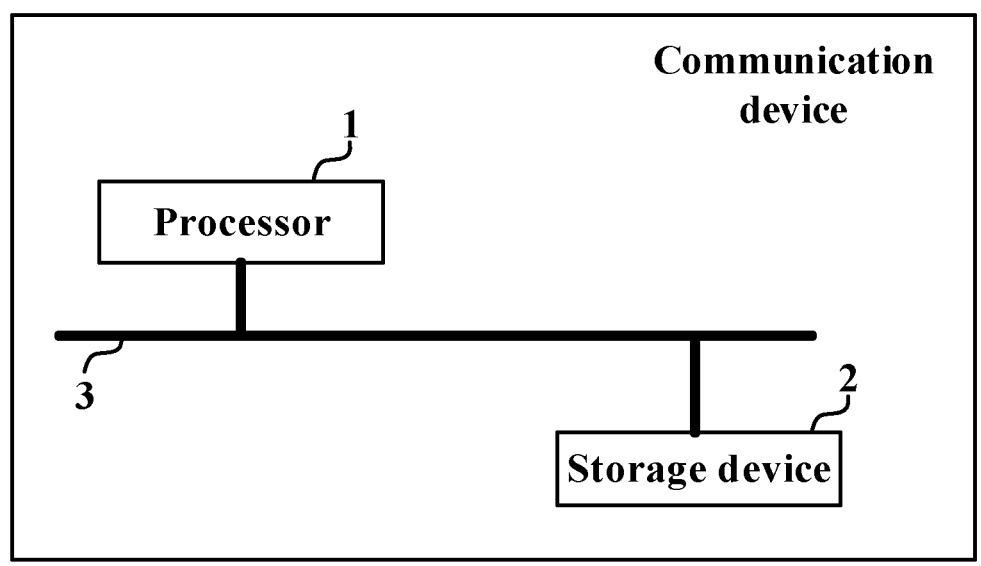
FIG. 5 shows a schematic structural diagram of a communication device according to a third embodiment of the present disclosure.

FIG. 5 shows a schematic structural diagram of a communication device according to a third embodiment of the present disclosure.

As shown in FIG. 5, the communication device according to the third embodiment of the present disclosure may include a processor 1 and a storage device 2. In some embodiments of the present disclosure, the processor 1 and the storage device 2 may be connected through a bus system 3 or other means. FIG. 5 is an example that the processor 1 and the storage device 2 is connected through a bus 3.

The storage device 2 stores program codes, and the processor 1 can execute the program codes stored in the storage device 2 to perform the following operations of:

Configuring at least one serving cell for each terminal, each of the at least one serving cell working on an unlicensed carrier;

Selecting at least one serving cell from the at least one serving cell as a primary cell or a primary secondary cell of the terminal, the selected at least one serving cell forming a primary cell group or a primary secondary cell group of the terminal;

Controlling the primary cell group or the primary secondary cell group to send a Master Information Block (MIB) to the terminal.

In one optional embodiment, the processor 1 executes the program codes stored in the storage device 2 to further perform the following operation:

Controlling a primary serving cell of a Master Evolved Node B working on a licensed frequency band to configure the at least one serving cell on a Secondary Evolved Node B for the terminal.

The primary serving cell selects the at least one serving cell from the at least one serving cell as the primary secondary cell on the Secondary Evolved Node B of the terminal, the selected at least one serving cell forming the primary secondary cell group on the Secondary Evolved Node B of the terminal.

In one optional embodiment, the processor 1 executes the program codes stored in the storage device 2 to further perform the following operation:

Controlling a primary serving cell of a Master Evolved Node B working on a licensed frequency band to configure at least one primary secondary serving cell working on an unlicensed frequency band on a Secondary Evolved Node B for the terminal, the at least one primary secondary serving cell configuring zero (0) or at least one cell working on the unlicensed frequency band on the Secondary Evolved Node B for the terminal, wherein the 0 or at least one cell and the at least one primary secondary serving cell form the at least one serving cell.

The at least one primary secondary serving cell selects the at least one serving cell from the at least one serving cell as the primary secondary cell on the Secondary Evolved Node B of the terminal, the selected at least one serving cell forming the primary secondary cell group on the Secondary Evolved Node B of the terminal.

In one optional embodiment, the processor 1 executes the program codes stored in the storage device 2 to further perform the following operation:

Controlling a primary serving cell of a Master Evolved Node B working on an unlicensed frequency band to configure zero (0) or at least one cell working on the unlicensed frequency band on the Master Evolved Node B for the terminal, wherein the 0 or at least one cell and the primary serving cell form the at least one serving cell.

The primary serving cell selected the at least one serving cell from the at least one serving cell as the primary cell of the terminal, the selected at least one serving cell forming the primary cell group of the terminal.

In one optional embodiment, the processor 1 executes the program codes stored in the storage device 2 to further perform the following operation:

Controlling cells of the primary cell group or the primary secondary cell group that detect that a downlink channel is idle to send the MIB.

In one optional embodiment, the processor 1 executes the program codes stored in the storage device 2 to further perform the following operation:

Controlling at least one of the cells of the primary cell group or the primary secondary cell group that detect that a downlink channel is idle to send the MIB concurrently.

In one optional embodiment, the processor 1 executes the program codes stored in the storage device 2 to further perform the following operation:

Controlling the cells of the primary cell group or the primary secondary cell group that detect that a downlink channel is idle to send the MIB non-concurrently.

Figure 6:
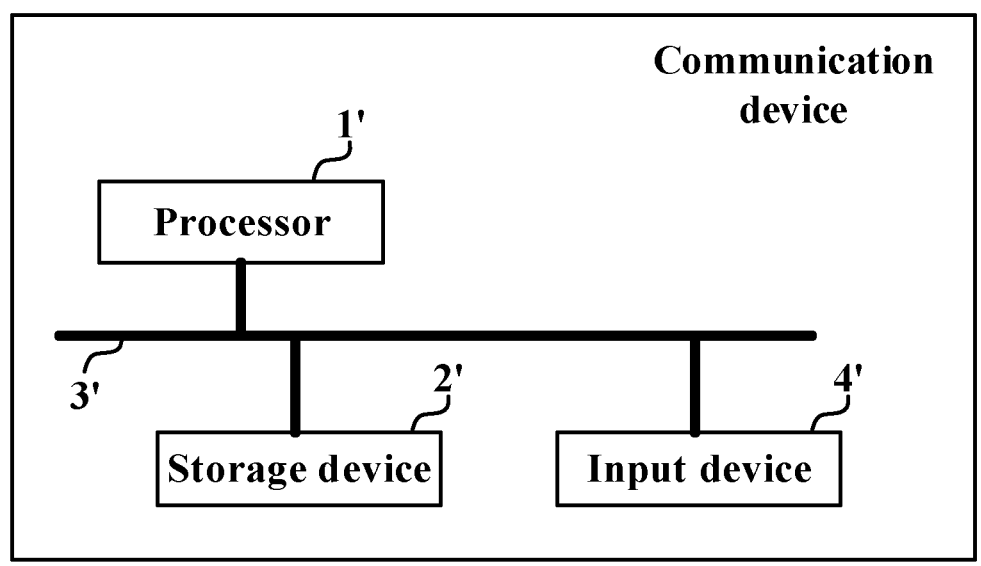
FIG. 6 shows a schematic structural diagram of a communication device according to a fourth embodiment of the present disclosure.

FIG. 6 shows a schematic structural diagram of a communication device according to a fourth embodiment of the present disclosure.

As shown in FIG. 6, the communication device according to the fourth embodiment of the present disclosure may include a processor 1', a storage device 2', and an input device 4'. In some embodiments of the present disclosure, the processor 1', the storage device 2', and the input device 4' may be connected through a bus system 3' or other means. FIG. 6 is an example that the processor 1', the storage device 2', and the input device 4' are connected through a bus system 3'.

The storage device 2' stores program codes, and the processor can execute the program codes stored in the storage device 2 to perform the following operations of:

Determining a primary cell group or a primary secondary cell group working on unlicensed carriers, the primary cell group or the primary secondary cell group being formed of cells selected from at least one serving cell working on the unlicensed carriers, each of the at least one serving cell working on one of the unlicensed carriers;

Receiving a Master Information Block (MIB) sent by cells of the primary cell group or the primary secondary cell group.

The steps in the method of the embodiments of the present disclosure may be sequentially adjusted, merged, and deleted according to actual needs.

The steps in the method of the embodiments of the present disclosure may be sequentially adjusted, merged, and deleted according to actual needs.

Persons of ordinary skill in the art can understand that all or part of the processes of the above embodiments may be implemented by executing a computer program by related hardware. The program may be stored in a computer readable storage medium. The storage medium may include a read-only memory (ROM), a random access memory (RAM), a programmable read-only memory (PROM), and an erasable programmable read-only memory (Erasable), programmable read only memory (EPROM), one-time programmable read-only memory (OTPROM), electronically-erasable programmable read-only memory (EEPROM), compact disc read-only memory (CD-ROM) or other optical disc storage, disk storage, magnetic tape storage, or any other medium readable by a computer that can be used to carry or store data.

The technical solutions of the present disclosure are described in detail above with reference to the accompanying drawings. The present disclosure proposes a new communication scheme, which improves a transmission probability of Master Information Block (MIB) of a primary cell group or a primary secondary cell group on an unlicensed frequency band, ensures that a user can receive the MIB in time to perform a time synchronization according to a System Frame Number (SFN) in the MIB, the communication is normal, and delay and efficiency requirements of communication are met.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A communication device, comprising:
a processor; and
a storage device storing a plurality of instructions, which when executed by the processor, causes the processor to:
configure at least one serving cell A for each terminal, each of the at least one serving cell A working on an unlicensed carrier;
select at least one serving cell B from the at least one serving cell A as a primary cell or a primary secondary cell of the terminal, the selected at least one serving cell B forming a primary cell group or a primary secondary cell group of the terminal; and
control the primary cell group or the primary secondary cell group to send a Master Information Block (MIB) to the terminal.

2. The communication device according to claim 1, wherein the processor further:
controls a primary serving cell of a Master Evolved Node B working on a licensed frequency band to configure the at least one serving cell A on a Secondary Evolved Node B for the terminal; and
controls the primary serving cell to select the at least one serving cell B from the at least one serving cell A as the primary secondary cell on the Secondary Evolved Node B of the terminal, the selected at least one serving cell B forming the primary secondary cell group on the Secondary Evolved Node B of the terminal.

3. The communication device according to claim 1, wherein the processor further:
controls a primary serving cell of a Master Evolved Node B working on a licensed frequency band to configure at least one primary secondary serving cell working on an unlicensed frequency band on a Secondary Evolved Node B for the terminal, the at least one primary secondary serving cell configuring zero (0) or at least one cell working on the unlicensed frequency band on the Secondary Evolved Node B for the terminal, wherein the 0 or at least one cell and the at least one primary secondary serving cell form the at least one serving cell A; and
controls the at least one primary secondary serving cell to select the at least one serving cell B from the at least one serving cell A as the primary secondary cell on the Secondary Evolved Node B of the terminal, the selected at least one serving cell B forming the primary secondary cell group on the Secondary Evolved Node B of the terminal.

4. The communication device according to claim 1, wherein the processor further:
controls a primary serving cell of a Master Evolved Node B working on an unlicensed frequency band to configure zero (0) or at least one cell working on the unlicensed frequency band on the Master Evolved Node B for the terminal, wherein the 0 or at least one cell and the primary serving cell form the at least one serving cell A; and
controls the primary serving cell to select the at least one serving cell B from the at least one serving cell A as the primary cell of the terminal, the selected at least one serving cell B forming the primary cell group of the terminal.

5. The communication device according to claim 1, wherein the processor further:
controls cells of the primary cell group or the primary secondary cell group that detect that a downlink channel is idle to send the MIB.

6. The communication device according to claim 5, wherein the processor further:
controls at least one of the cells of the primary cell group or the primary secondary cell group that detect that the downlink channel is idle to send the MIB concurrently.

7. The communication device according to claim 5, wherein the processor further:
controls the cells of the primary cell group or the primary secondary cell group that detect that the downlink channel is idle to send the MIB non-concurrently.

8. The communication device according to claim 5, wherein the downlink channel is determined to be idle when any cell of the primary cell group or the primary secondary group detects that the downlink channel corresponding to six consecutive resource blocks in a limited frequency domain is idle, wherein a bandwidth of the limited frequency domain is equal to or less than a bandwidth of the cell and is greater than or equal to six resource blocks.

9. The communication device according to claim 5, wherein the operation of controlling cells of the primary cell group or the primary secondary cell group that detect that the downlink channel is idle to send the MIB comprises:
controlling the cell to send the MIB in a remaining time of a subframe n when the downlink channel is detected to be idle during a channel detection of (16 μs+M×9 μs) at a starting position of the subframe n; or
controlling the cell to send the MIB in the subframe n when the downlink channel is detected to be idle during a channel detection of (16 μs+M×9 μs) at an end position of a subframe previous to the subframe n;
wherein M is equal to one (1) or two (2).

10. The communication device according to claim 5, wherein the operation of detecting, by any cell of the primary cell group or the primary secondary cell group, that the downlink channel is idle comprises:
selecting a random number from zero (0) to a contention window range when the downlink channel is detected to be idle for (16 μs+M×9 μs), wherein M is a positive integer; and
continuing detecting the downlink channel in a period of 9 μs after the random number is selected, keeping the random number unchanged when the downlink channel is detected to be not idle, and decrementing the random number by 1 when the downlink channel is detected to be idle for (16 μs+M×9 μs); and decrementing the random number by 1 when the downlink channel is detects to be idle;
determining that the downlink channel can be occupied when the random number is decremented to zero (0).

11. The communication device according to claim 1, wherein a sending time of the MIB is greater than or equal to a time occupied by one symbol, and less than or equal to a time occupied by four symbols.

12. A communication method, comprising:
configuring at least one serving cell A for each terminal, each of the at least one serving cell A working on an unlicensed carrier;
selecting at least one serving cell B form the at least one serving cell A as a primary cell or a primary secondary cell of the terminal, the selected at least one serving cell B forming a primary cell group or a primary secondary cell group of the terminal; and controlling the primary cell group or the primary secondary cell group to send a Master Information Block (MIB) to the terminal.

13. The communication method according to claim 12, wherein:

a primary serving cell of a Master Evolved Node B working on a licensed frequency band configures the at least one serving cell A on a Secondary Evolved Node B for the terminal, wherein the primary serving cell selects the at least one serving cell B from the at least one serving cell A as the primary secondary cell on the Secondary Evolved Node B of the terminal, the selected at least one serving cell B forming the primary secondary cell group on the Secondary Evolved Node B of the terminal; or the primary serving cell of the Master Evolved Node B working on the licensed frequency band configures the at least one primary secondary serving cell working on the unlicensed frequency band on the Secondary Evolved Node B for the terminal, the at least one primary secondary serving cell configuring zero (0) or at least one cell working on the unlicensed frequency band on the Secondary Evolved Node B for the terminal, the 0 or at least one cell and the at least one primary secondary serving cell forming the at least one serving cell A, wherein the at least one primary secondary serving cell selects the at least one serving cell B from the at least one serving cell A as the primary secondary cell on the Secondary Evolved Node B of the terminal, the selected at least one serving cell B forming the primary secondary cell group on the Secondary Evolved Node B of the terminal, and configuration signaling used for configuring the 0 or at least one cell for the terminal are sent by one or more of the at least one primary secondary serving cell when an amount of the at least one primary secondary serving cell is more than one; or the primary serving cell of the Master Evolved Node B working on the unlicensed frequency band to configure zero (0) or at least one cell working on the unlicensed frequency band on the Master Evolved Node B for the terminal, wherein the 0 or at least one cell and the primary serving cell form the at least one serving cell A, wherein the primary serving cell selects the at least one serving cell B of the at least one serving cell A as the primary cell of the terminal, the selected at least one serving cell B forming the primary cell group of the terminal.

14. The communication method according to claim 12, wherein the operation of controlling the primary cell group or the primary secondary cell group to send a Master Information Block (MIB) to the terminal comprises:

controlling cells of the primary cell group or the primary secondary cell group that detect that a downlink channel is idle to send the MIB.

15. The communication method according to claim 14, further comprises:

controlling at least one of the cells of the primary cell group or the primary secondary cell group that detect that a downlink channel is idle to send the MIB concurrently; and/or controlling the cells of the primary cell group or the primary secondary cell group that detect that a downlink channel is idle to send the MIB non-concurrently.

16. The communication method according to claim 14, wherein the downlink channel is determined to be idle when any cell of the primary cell group or the primary secondary group detects that the downlink channel corresponding to six consecutive resource blocks in a limited frequency domain is idle, wherein a bandwidth of the limited frequency domain is equal to or less than a bandwidth of the cell and is greater than or equal to six resource blocks;

wherein the six consecutive resource blocks are predefined with a resource block number.

17. The communication device according to claim 14, wherein the operation of controlling any cell of the primary cell group or the primary secondary cell group that detect that the downlink channel is idle to send the MIB comprises:

controlling the cell to send the MIB in a remaining time of a subframe n when the downlink channel is detected to be idle during a channel detection of (16 μs+M×9 μs) at a starting position of the subframe n; or controlling the cell to send the MIB in the subframe n when the downlink channel is detected to be idle during a channel detection of (16 μs+M×9 μs) at an end position of a subframe previous to the subframe n;

wherein M is equal to one (1) or two (2).

18. The communication device according to claim 14, wherein the operation of detecting, by any cell of the primary cell group or the primary secondary cell group, that the downlink channel is idle comprises:

selecting a random number from zero (0) to a contention window range when the downlink channel is detected to be idle for (16 μs+M×9 μs), wherein M is a positive integer; and continuing detecting the downlink channel in a period of 9 μs after the random number is selected, keeping the random number unchanged when the downlink channel is detected to be busy, and decrementing the random number by 1 when the downlink channel is detected to be idle for (16 μs+M×9 μs); and decrementing the random number by 1 when the downlink channel is detects to be idle;

determining that the downlink channel can be occupied when the random number is decremented to 0.

19. The communication device according to claim 12, wherein a sending time of the MIB is greater than or equal to a time occupied by one symbol, and less than or equal to a time occupied by four symbols.

20. A communication method, comprising:

determining, by a terminal, a primary cell group or a primary secondary cell group working on unlicensed carriers;

receiving a Master Information Block (MIB) sent by cells of the primary cell group or the primary secondary cell group;

wherein the primary cell group or the primary secondary cell group is formed of cells selected from at least one serving cell working on the unlicensed carriers, each of the at least one serving cell working on one of the unlicensed carriers.

* * * * *

UNITED STATES PATENT AND TRADEMARK OFFICE
CERTIFICATE OF CORRECTION

PATENT NO. : 10,735,971 B2
APPLICATION NO. : 16/331610
DATED : August 4, 2020
INVENTOR(S) : Li et al.

It is certified that error appears in the above-identified patent and that said Letters Patent is hereby corrected as shown below:

On the Title Page

Please replace item (73) regarding "Assignees" with the following:
(73) YULONG COMPUTER TELECOMMUNICATION SCIENTIFIC (SHENZHEN) CO., LTD., Shenzhen (CN)

Signed and Sealed this
Eighth Day of December, 2020

Andrei Iancu
*Director of the United States Patent and Trademark Office*